United States Patent [19]

Nakamura

[11] Patent Number: 4,922,359
[45] Date of Patent: May 1, 1990

[54] ROTARY HEAD TYPE DIGITAL AUDIO TAPE RECORDER

[75] Inventor: Tokuo Nakamura, Niigata, Japan

[73] Assignee: Alps Electric Co., Ltd., Tokyo, Japan

[21] Appl. No.: 206,453

[22] Filed: Jun. 13, 1988

[30] Foreign Application Priority Data

Aug. 27, 1987 [JP] Japan .................... 62-213895

[51] Int. Cl.⁵ .................... G11B 5/52; G11B 21/18
[52] U.S. Cl. .................... 360/107; 360/84; 360/85
[58] Field of Search .................... 360/107, 85, 95, 84

[56] References Cited

U.S. PATENT DOCUMENTS

| | | | |
|---|---|---|---|
| 4,318,146 | 3/1982 | Ike et al. | 360/107 |
| 4,646,169 | 2/1987 | Shimpuku | 360/21 |
| 4,757,397 | 7/1988 | Zaitsu et al. | 360/85 |
| 4,794,473 | 12/1988 | Kawasaki | 360/73.12 |

FOREIGN PATENT DOCUMENTS

| | | | |
|---|---|---|---|
| 52-73011 | 6/1977 | Japan | 360/107 |
| 59-52407 | 3/1984 | Japan | 360/107 |
| 59-157804 | 9/1984 | Japan | 360/107 |
| 60-57505 | 4/1985 | Japan | 360/85 |

Primary Examiner—John H. Wolff
Attorney, Agent, or Firm—Guy W. Shoup; Norman L. Klivans

[57] ABSTRACT

A rotary digital audio tape recorder having a rotary cylinder of a predetermined diameter driven at a predetermined rotation rate, a pair of recording/reproducing heads disposed in proximity of each other on the rotary cylinder, and a magnetic tape kept in contact with the peripheral surface of the rotary cylinder through a predetermined lap angle, wherein a recording or reproducing operation is performed on the magnetic tape with the rotation of the cylinder and the relative motion of the magnetic tape. The rotation rate of the cylinder and the lap angle of the magnetic tape thereto are selectively so set as to retain interchangeability with any magnetic tape recorded or reproduced by a conventional rotary cylinder with two magnetic heads disposed opposite to each other at an angular interval of 180°. Since the diameter of the rotary cylinder is thus rendered smaller, the whole structure can be dimensionally reduced while a sufficiently high head output is obtainable with a satisfactory signal-to-noise ratio being retained.

3 Claims, 1 Drawing Sheet

ROTARY HEAD TYPE DIGITAL AUDIO TAPE RECORDER

BACKGROUND OF THE INVENTION

1. Field of the Invention

The present invention relates to improvements in a rotary digital audio tape recorder (hereinafter referred to as R-DAT).

2. Description of the Prior Art

In the known R-DAT, generally a rotary cylinder is rotated at a predetermined rate with relative motion of a magnetic tape which is driven while being kept in contact with the peripheral surface of such rotary cylinder through a predetermined lap angle, and a recording or reproducing operation is performed by a pair of recording/reproducing heads on the rotary cylinder with switchover of signals. One conventional example of such R-DAT is schematically shown in FIG. 3, wherein a pair of magnetic heads 2 and 3 are disposed at an angular interval of 180° on a rotary cylinder 1 having a diameter of 30 mm. Each of the magnetic heads 2 and 3 employed in this example serves as a recording/reproducing head. A magnetic tape T is held around the rotary cylinder 1 at a predetermined track angle by means of conical tape guides 4 and 5 while being kept in contact with the peripheral surface of the cylinder 1 through a lap angle of 90°. As the magnetic tape T is moved relatively to the rotary cylinder 1 driven at a rate of 2000 rpm, the magnetic heads 2 and 3 alternately function to perform a recording or reproducing operation on the magnetic tape T. According to the above R-DAT, there are attainable some advantages including a sufficient head output and a high signal reproducibility with a satisfactory signal-to-noise ratio. On the other hand, there also exists a disadvantage that the whole structure becomes dimensionally large since the rotary cylinder has a great diameter of 30 mm.

Meanwhile, on the basis of the principle that the lap angle and the cylinder diameter are in inverse proportion, another exemplary R-DAT may be contrived as shown in FIG. 4, wherein the diameter of a cylinder 1 is reduced to 15 mm which is one half of the diameter in the foregoing example and the lap angle $\theta 2$ is widened to 180°. In this R-DAT where the cylinder diameter is small, the whole structure can be dimensionally diminished to have a reduced thickness and still the interchangeability of the magnetic tape T is maintained. However, since the rotation rate of the cylinder 1 is kept at a fixed value of 2000 rpm, the relative running speed of the magnetic tape T is lowered due to the smaller cylinder diameter, and therefore it is unavoidable that the head output is decreased with deterioration of the signal-to-noise ratio in reproduction.

SUMMARY OF THE INVENTION:

An object of the present invention is to provide an improved R-DAT which can be constructed in smaller dimensions as a whole with retention of a sufficiently high head output.

The fundamental concept of the present invention is based on the principle that the lap angle and the cylinder diameter are in inverse proportion to each other. That is, in a rotary digital audio tape recorder where a pair of recording/reproducing heads are disposed on a rotary cylinder of a predetermined diameter rotated at a predetermined rate, a magnetic tape is kept in contact with the peripheral surface of such rotary cylinder through a predetermined lap angle, and signals are recorded on and/or reproduced from the magnetic tape with rotation of the cylinder and relative motion of the magnetic tape. In such a constitution, the feature of the present invention resides in a novel structure where a pair of recording/reproducing heads are disposed in proximity of each other on the rotary cylinder, and the rotation rate of the cylinder and the lap angle of the magnetic tape thereto are so selectively set as to retain interchangeability with any magnetic tape recorded or reproduced by the rotary cylinder which is equipped with a pair of recording/reproducing heads disposed opposite to each other at an angular interval of 180°.

Figure 1:
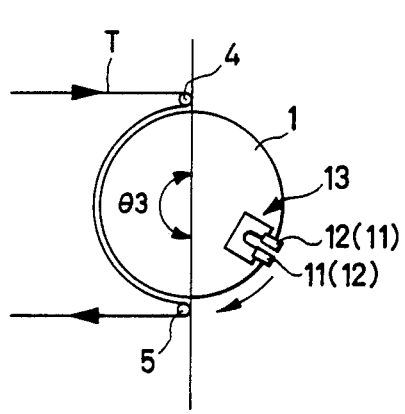
FIG. 1 schematically illustrates a rotary digital audio tape recorder (R-DAT) according to the present invention.
Figure 2:
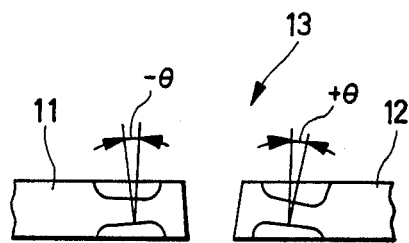
FIG. 2 is an enlarged view of an exemplary double azimuth head consisting of a recording head and a reproducing head disposed in proximity of each other.
Figure 3:
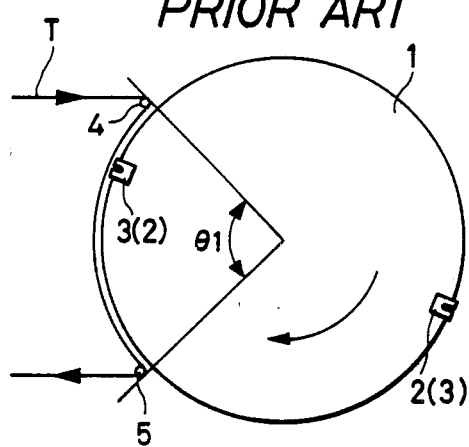
FIG. 3 schematically illustrates a conventional R-DAT.
Figure 4:
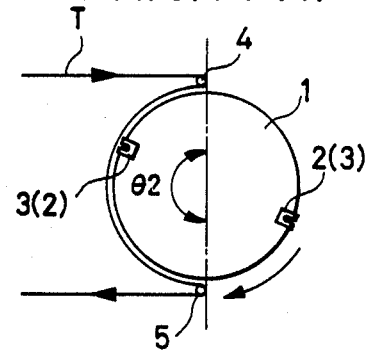
FIG. 4 schematically illustrates another conventional R-DAT.

DETAILED DESCRIPTION OF THE PREFERRED EMBODIMENT:

Hereinafter an exemplary embodiment of the present invention will be described in detail with reference to FIG. 1, wherein component parts corresponding to those used in FIGS. 2 and 3 are denoted by the same reference numerals and symbols.

In the present invention, the positions of magnetic heads are different from those in the conventional R-DAT. That is, in contrast with the conventional R-DAT where magnetic recording/reproducing heads 2 and 3 are disposed opposite to each other to have an angular interval of 180° on a rotary cylinder 1, the present invention has such a structural feature that one recording/reproducing head 11 and another recording/reproducing head 12 are disposed in the proximity of each other on the rotary cylinder 1. The two recording/reproducing heads 11 and 12 are so positioned as to have a relationship of mutually reverse azimuths, and it is preferred that a double azimuth head 13 be constituted as illustrated in FIG. 2.

For the purpose of achieving the interchangeability with the conventional R-DAT where the magnetic heads 2 and 3 are disposed at an angular interval of 180°, the present invention is so contrived that, in combination with such mutual proximity of the two recording/reproducing heads 11 and 12, the rotary cylinder 1 is shaped to have a smaller diameter and is driven at a double rotation rate as compared with the known rate on the basis of the principle that the lap angle and the cylinder diameter are in inverse proportion to each other, and the lap angle $\theta 3$ of the magnetic tape T kept in contact with the peripheral surface of the rotary cylinder 1 at a predetermined track angle is selectively set to 180° or more. For example, if the diameter of the cylinder 1 is reduced to 15 mm in the embodiment of FIG. 1, the lap angle $\theta$ becomes 180° according to the principle mentioned, and the rotation rate of the cylinder 1 is set to 4000 rpm.

In the above R-DAT where the rotation rate of the cylinder 1 is doubled as compared with the known rate, the relative running speed of the magnetic tape T is maintained to be stable in accordance with such rotation rate. And a recording or reproducing operation is performed in such a state by the recording/reproducing heads 11 and 12 with alternate switchover of output signals per rotation of the cylinder 1, so that a high head output is obtained with realization of a satisfactory signal-to-noise ratio. Thus, according to the present invention, the whole structure can be dimensionally reduced due to the smaller diameter of the cylinder 1 while a sufficient head output is still maintained.

In the above embodiment, a description has been given with reference to an exemplary case of setting the diameter of the cylinder 1 to 15 mm, the rotation rate thereof to 4000 rpm and the lap angle $\theta_3$ to 180, respectively. However, if the lap angle $\theta_3$ is set to more than 180° (maximally to 360°), the diameter of the cylinder 1 can be further reduced in accordance therewith on the basis of the aforementioned principle that the lap angle and the cylinder diameter are in inverse proportion to each other. It is a matter of course that, in this case also, the rotation rate of the cylinder 1 can be increased relatively.

In the R-DAT of the present invention, as described hereinabove, a dimensional reduction of the whole structure can be accomplished in a state where a high head output is obtainable with a satisfactory signal-to-noise ratio being retained.

What is claimed is:

1. In a rotary digital audio tape recorder where a pair of recording/reproducing heads are disposed on a rotary cylinder of a predetermined diameter driven at a predetermined rotation rate, and a magnetic tape is kept in contact with the peripheral surface of said rotary cylinder through a predetermined lap angle, so that a recording or reproducing operation is performed on said magnetic tape with the rotation of said cylinder and the relative motion of said magnetic tape;

wherein the improvement comprises said pair of recording/reproducing heads being disposed in a proximity of less than 90° to each other on said rotary cylinder, and the rotation rate of said cylinder and the lap angle of said magnetic tape thereto are so selectively set as to retain the inter-changeability with any magnetic tape recorded or reproduced by a rotary cylinder equipped with a pair of recording/reproducing heads disposed opposite to each other at an angular interval of 180°; and wherein no other recording/reproducing heads are disposed on the rotary cylinder.

2. The rotary digital audio tape recorder according to claim 1, wherein said pair or recording/reproducing heads together form one double azimuth type head structure.

3. The rotary digital audio tape recorder according to claim 1
wherein a diameter of said rotary cylinder is a predetermined fractional value of 30 mm, and the angular speed of said rotary cylinder is about 2000 rotations per minute multiplied by a factor equal to the inverse of the predetermined fractional value.

* * * * *